United States Patent [19]

Haber et al.

[11] Patent Number: 5,774,637
[45] Date of Patent: Jun. 30, 1998

[54] CORDLESS PRINTER CONTROL DEVICE

[75] Inventors: Alan P. Haber, Ramot; Simon M. Kahn, Jerusalem, both of Israel

[73] Assignee: ITI Innovative Technology Ltd., Jerusalem

[21] Appl. No.: 150,815

[22] Filed: Nov. 12, 1993

[51] Int. Cl.⁶ .................................................. G06K 15/00
[52] U.S. Cl. ........................................... 395/114; 395/112
[58] Field of Search ..................................... 395/112, 114, 395/106, 101, 113, 828, 800, 837–838, 865–868, 286, 311, 601; 370/94.1, 913, 349, 389, 334, 342; 364/424.04; 358/442, 468, 401, 407, 408, 434–439; 359/154, 118, 143, 165; 455/31.1, 69, 115, 151.2, 95; 399/1–2, 8; 347/142; 235/432, 379, 380; 340/825.72, 825.69

[56] References Cited

U.S. PATENT DOCUMENTS

| | | | |
|---|---|---|---|
| 4,523,087 | 6/1985 | Benton | 235/379 |
| 4,972,349 | 11/1990 | Kleinberger | 364/900 |
| 5,046,066 | 9/1991 | Messenger | 370/94.1 |
| 5,065,321 | 11/1991 | Bezos et al. | 364/424.04 |
| 5,099,346 | 3/1992 | Lee et al. | 359/118 |
| 5,247,380 | 9/1993 | Lee et al. | 359/118 |
| 5,386,590 | 1/1995 | Dolan | 455/33.1 |
| 5,425,135 | 6/1995 | Motoyama et al. | 395/114 |

Primary Examiner—Edward L. Coles, Sr.
Assistant Examiner—Dov Popovici
Attorney, Agent, or Firm—Edward Langer

[57] ABSTRACT

A printer control device which operates via a cordless link to control a dedicated printer in a shared access mode, allowing access by an alternate computer. In the preferred embodiment, the cordless printer control device operates in an environment in which a host computer is directly connected to a dedicated printer which operates in a normal printing mode. The device is provided as a pair of compact add-on units, a transmitter unit connected to a portable computer and a receiver/switch unit connected to the dedicated printer. The pair of units operate to provide an infrared transmission link by which an alternate/portable computer can detect a break in the normal printing mode and temporarily access the dedicated printer for printing tasks. The receiver/switch unit is provided with a time-out switch which operates to allow the alternate computer to gain access to the printer only if during a predetermined interval, the dedicated printer is not busy with a printing task already assigned to it. Once the portable computer has gained temporary access, the time-out switch protects its continued use of the dedicated printer without allowing the host computer to regain control until the task is completed.

14 Claims, 18 Drawing Sheets

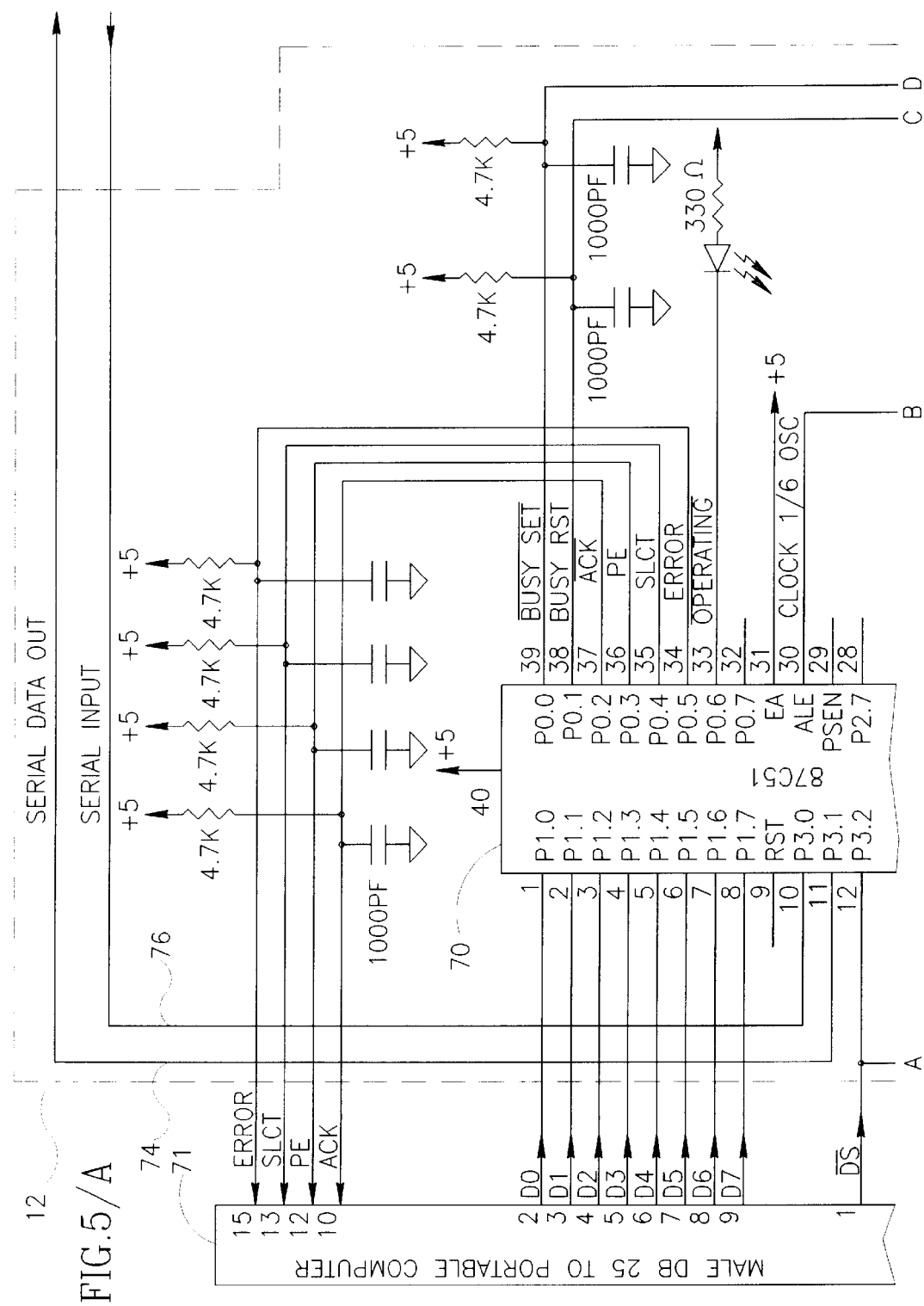
FIG.5/A

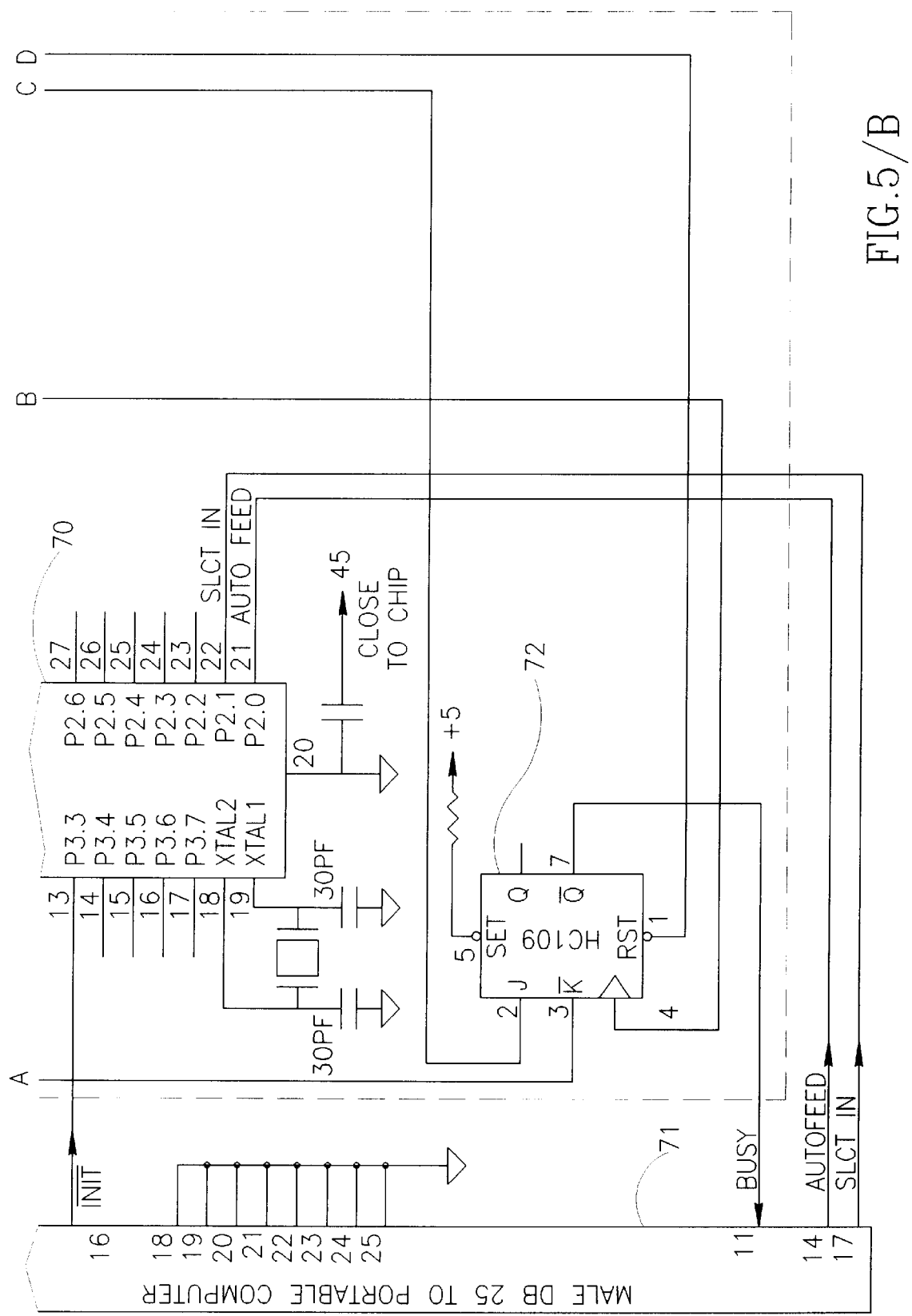
FIG.5/B

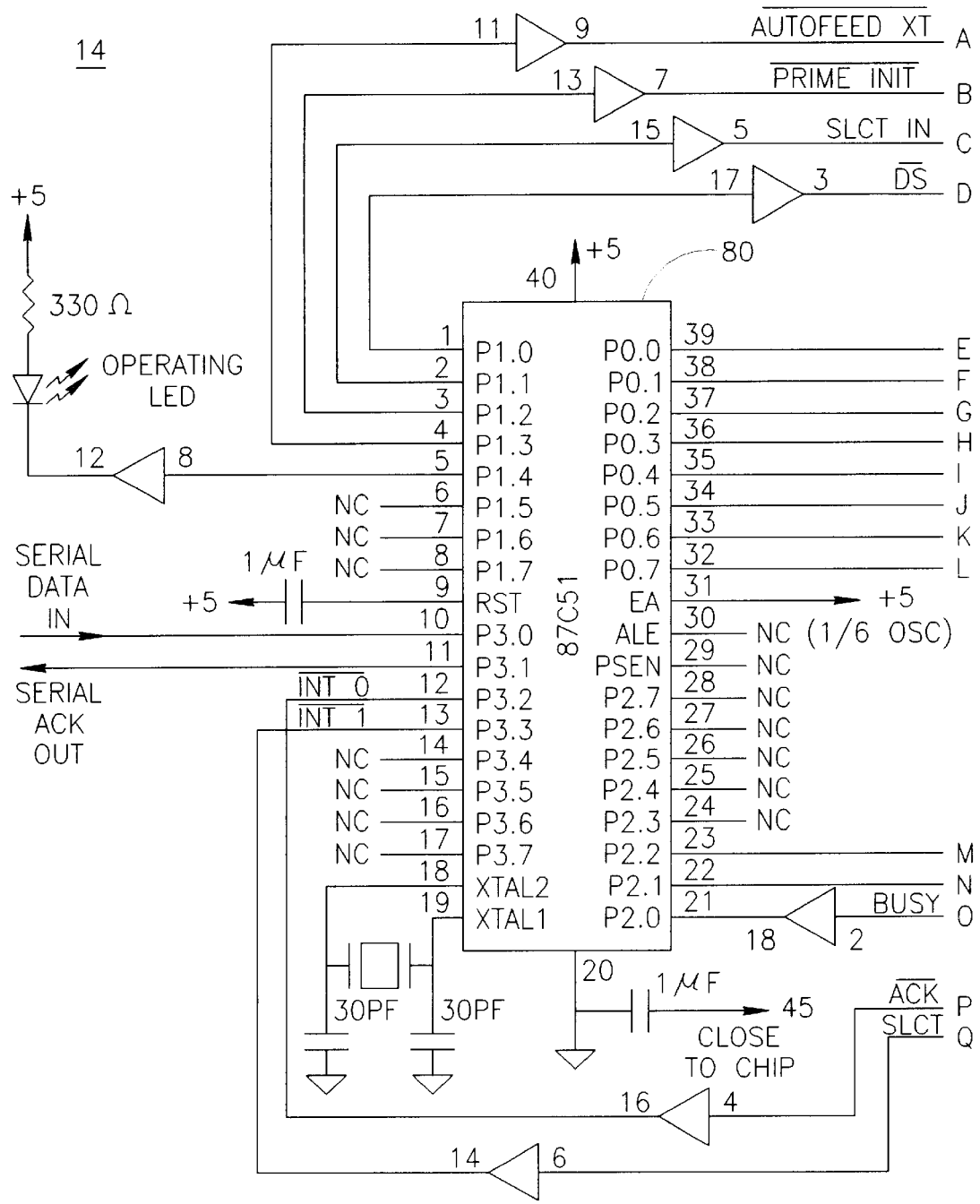
FIG.6/A

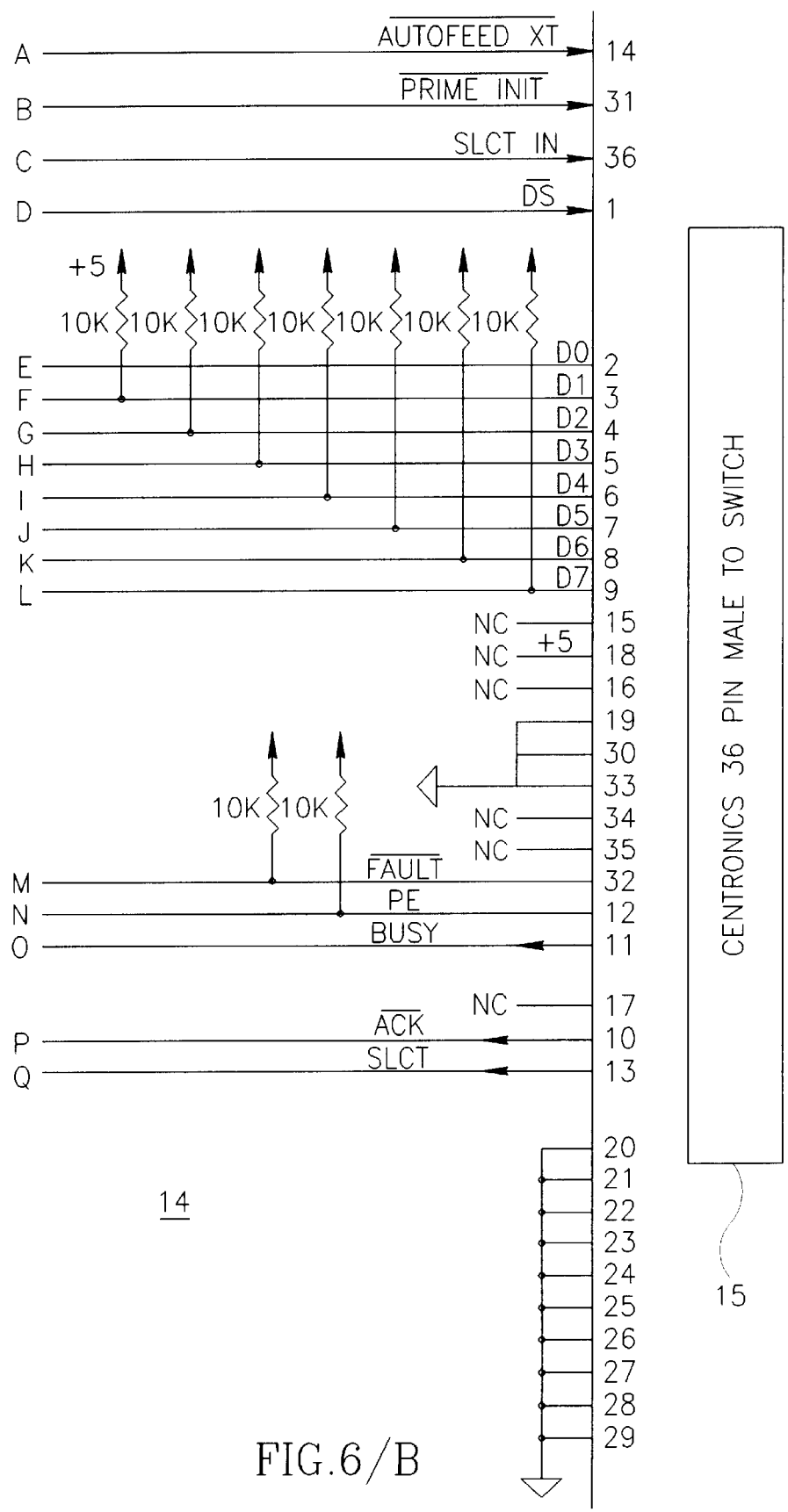
FIG.6/B

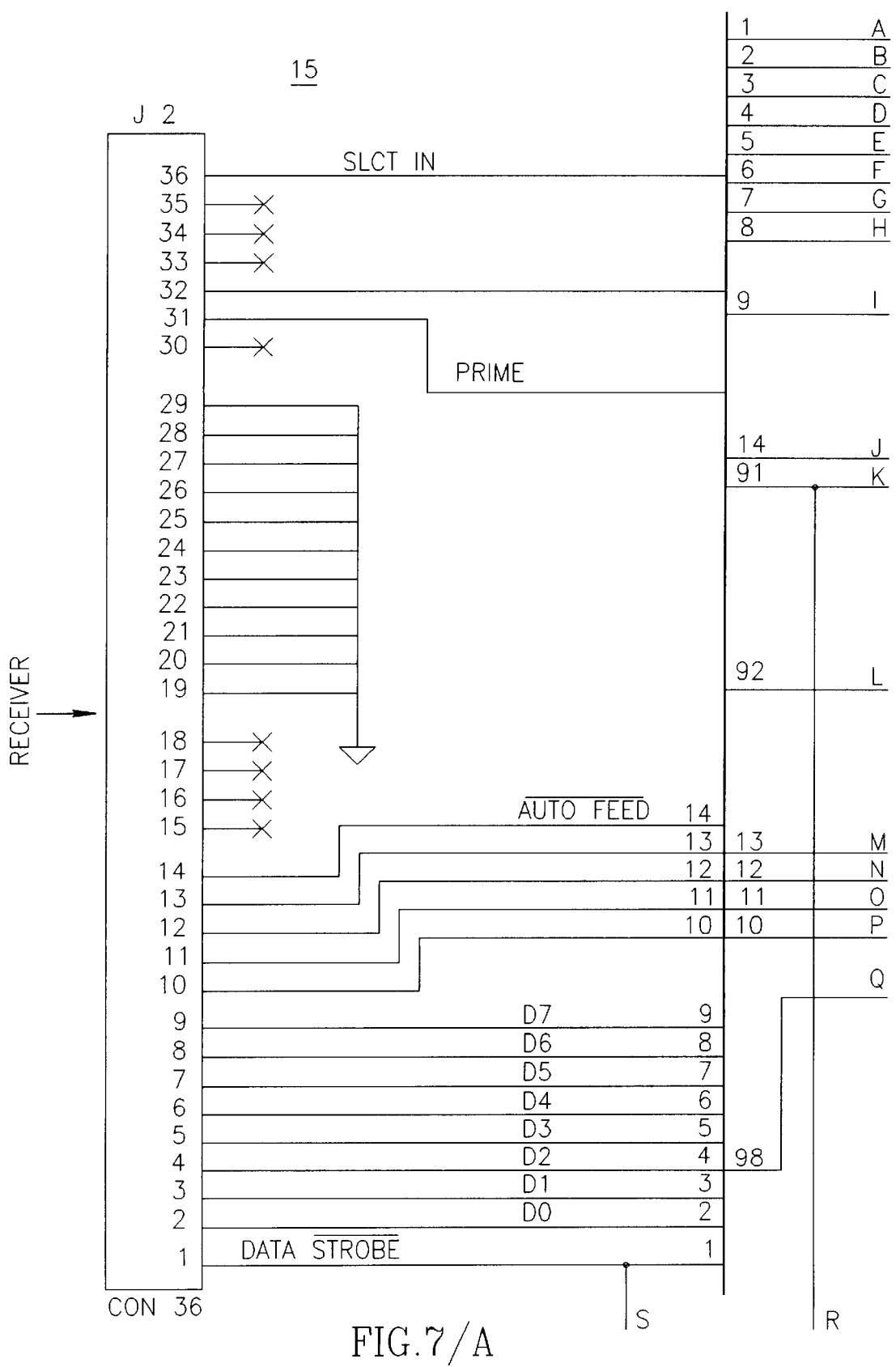
FIG.7/A

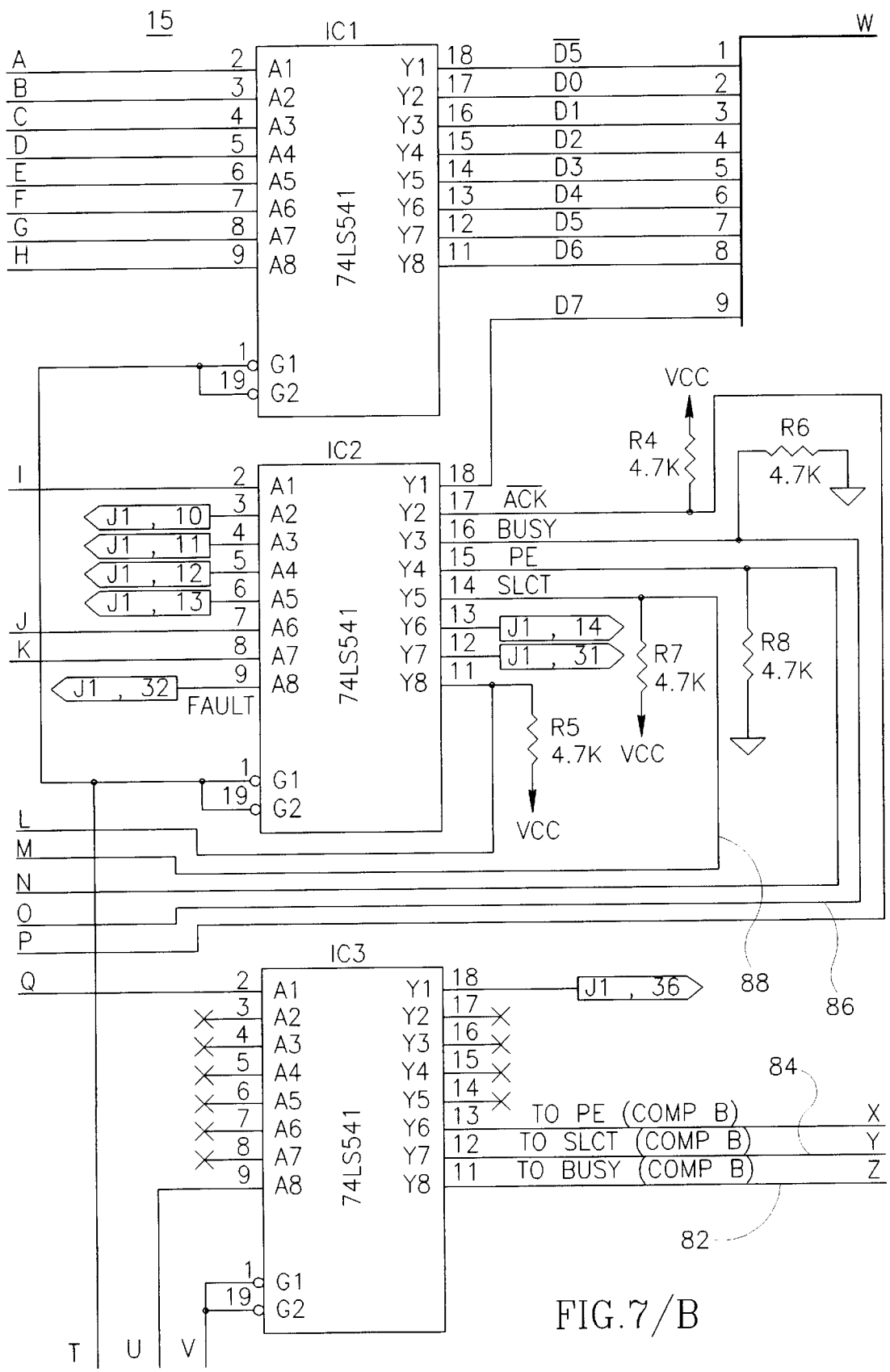
FIG.7/B

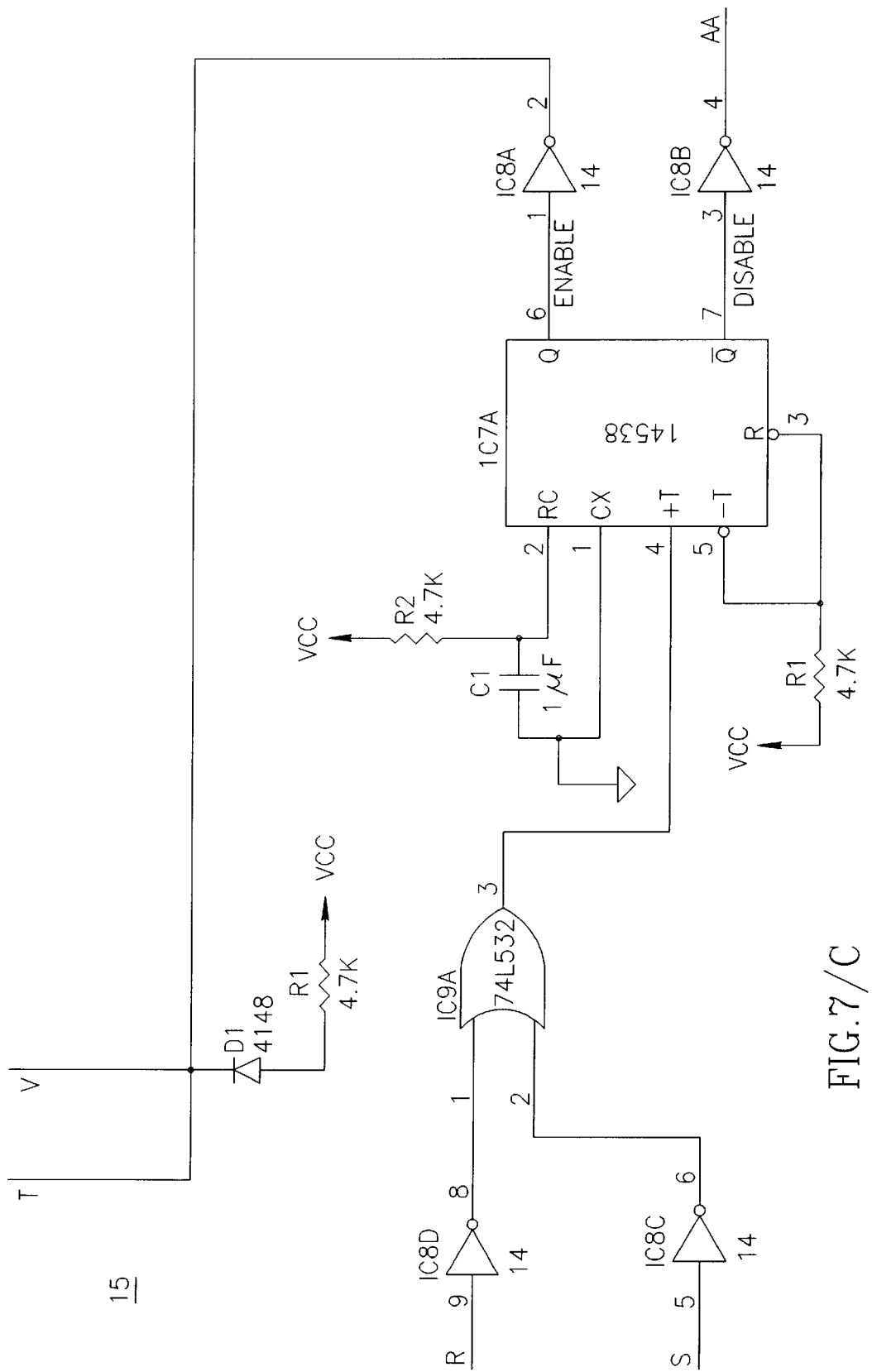
FIG.7/C

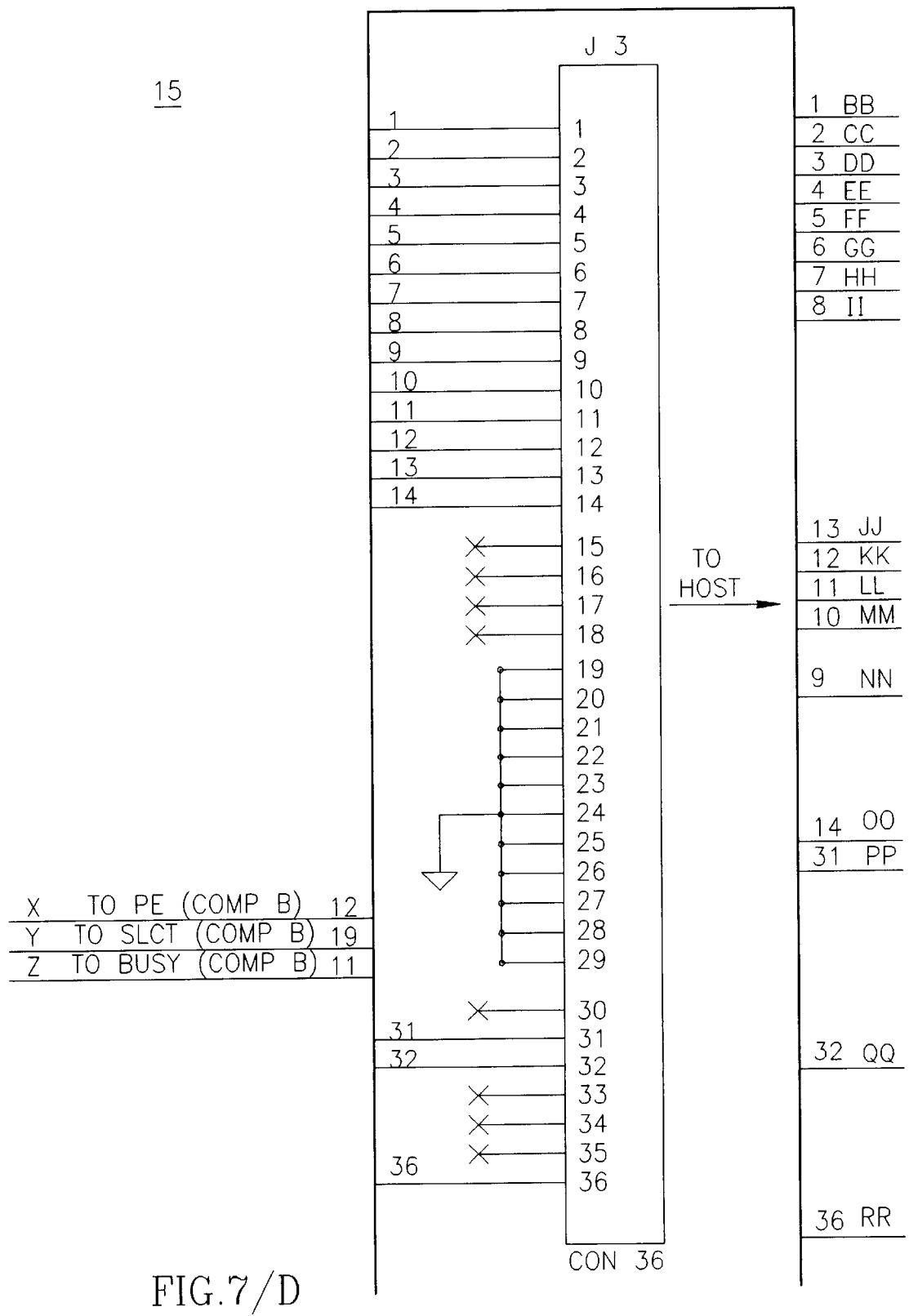
FIG.7/D

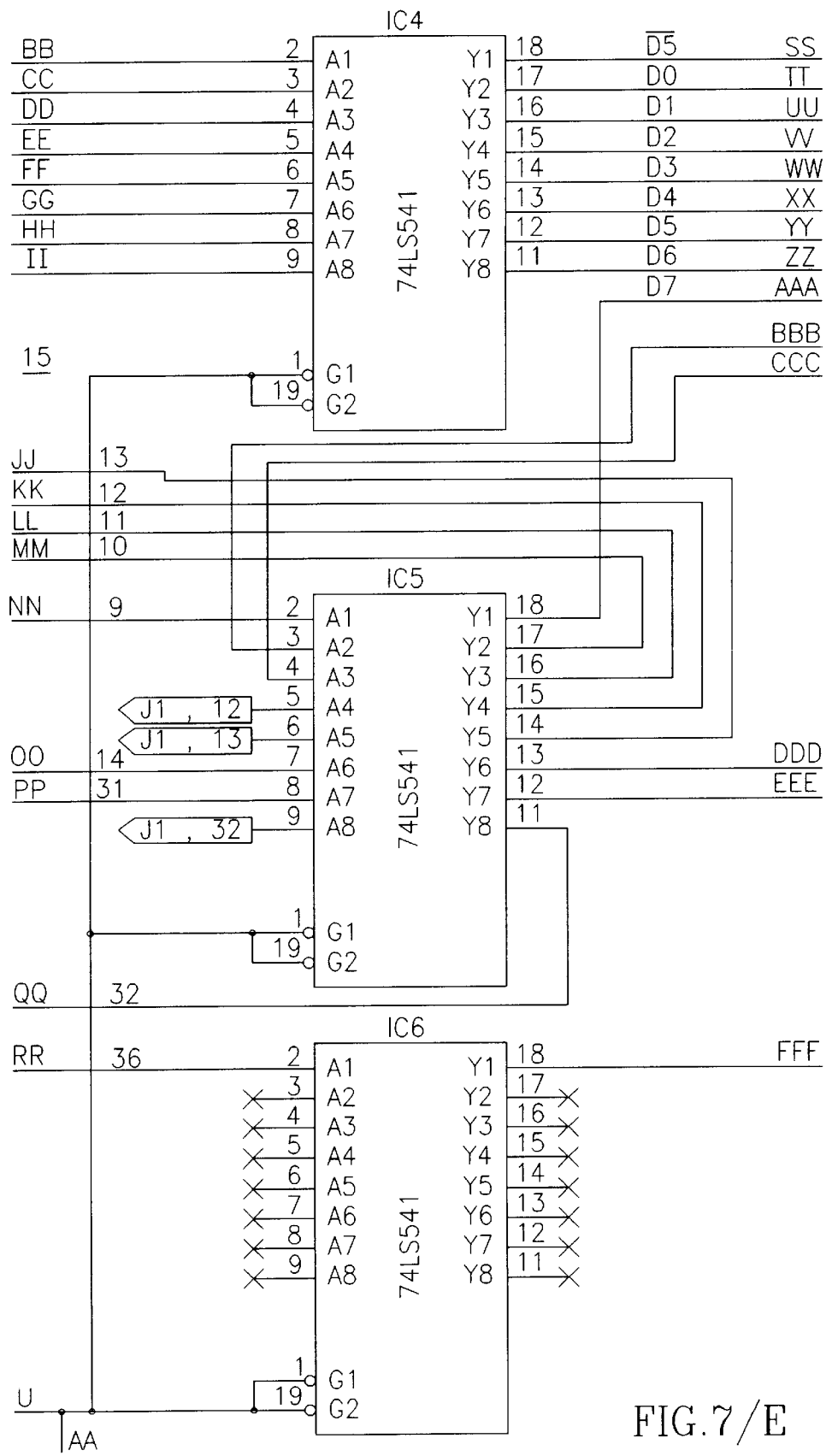
FIG.7/E

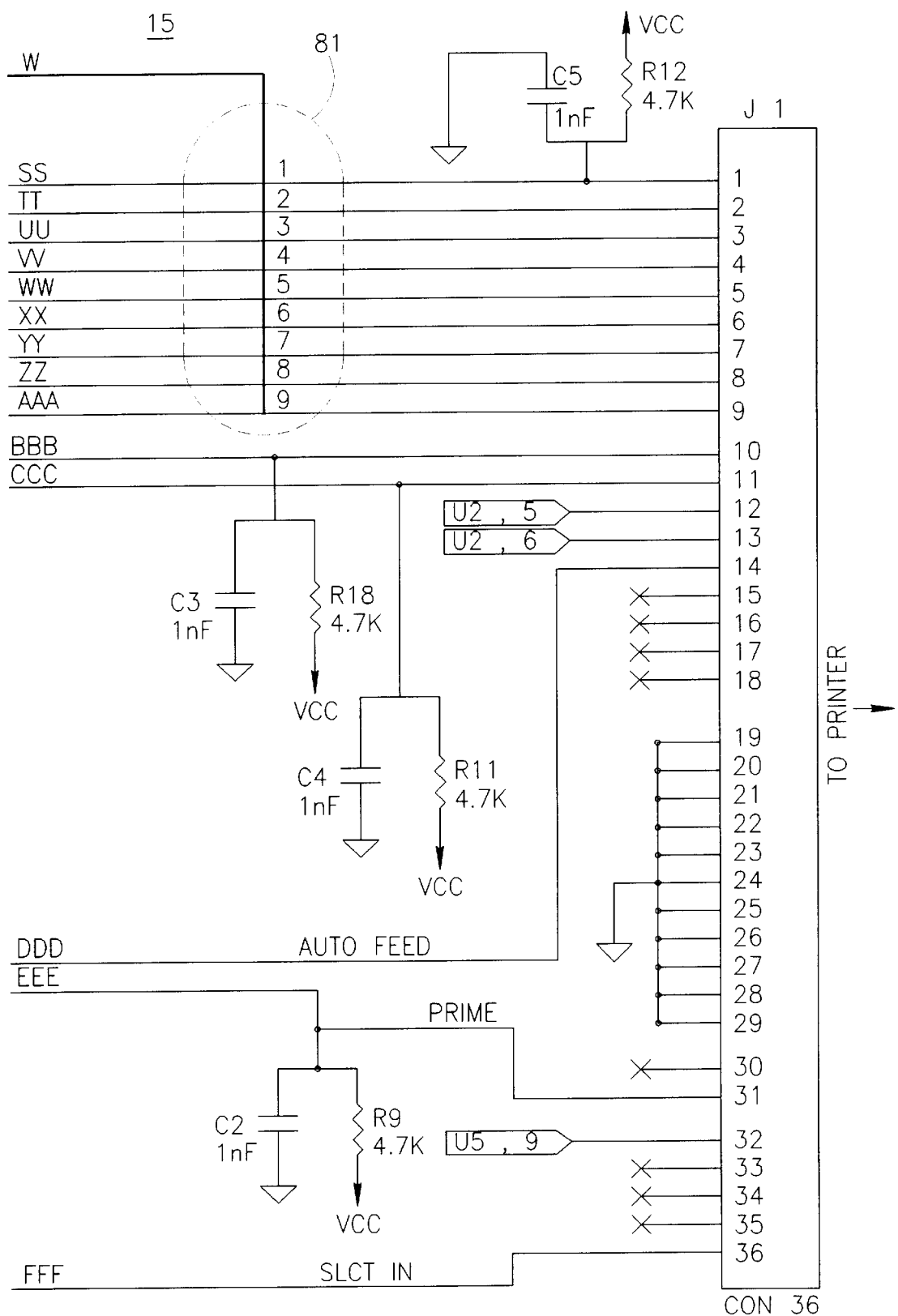
FIG.7/F

CORDLESS PRINTER CONTROL DEVICE

FIELD OF THE INVENTION

The present invention relates to computer peripheral devices, such as printers and associated data control devices, and more particularly, to a printer control device for cordless control of a dedicated printer in a shared print mode.

BACKGROUND OF THE INVENTION

The continuing proliferation of portable computing and wordprocessing equipment has made the portable office a reality. Especially apparent today in all transportation terminals are an increasing number of traveling business executives, waiting for a departure while busily updating their laptop computers with meeting notes, for example. When the executive arrives at his destination or returns to the office, there exists an immediate need to print these notes, and this determines how quickly the executive can reap the fruits of the work/travel time. Temporary access by a portable computer to a dedicated printer which is already connected to office computers is problematic, since this requires manipulation of the connections for each printer station, and cabling and plug adapters. This involves disturbing the existing hardware connections, changing printing modes, and causing unecessary downtime, and possibly even equipment damage.

Therefore, it would be desirable to provide a device to enable a portable computer to temporarily access a dedicated printer without requiring cabling and connection changes.

SUMMARY OF THE INVENTION

Accordingly, it is a principal object of the present invention to overcome the above-mentioned problems associated with printing arrangements involving temporary access to dedicated printers, and provide a printer control device which operates via a cordless link to control a dedicated printer in a shared access mode, allowing access by an alternate computer.

In accordance with a preferred embodiment of the present invention, there is provided a cordless printer control device for controlling a printer dedicated to a host computer, said device comprising:

means for generating a set of printer data and control information signals in accordance with data available at a printer output port of an alternate computer;

means for transmitting said printer data and control signal set via a cordless link;

means for receiving said transmitted printer data and control signal set; and switching means connected to said receiving means, the dedicated printer, and the host computer, said switching means being operable in one of normal and temporary access modes to control the dedicated printer via respectively, the host computer in said normal mode, and said alternate computer in said temporary access mode, in accordance with said printer data and control signal set.

In the preferred embodiment, the inventive cordless printer control device operates in an environment in which a host computer is directly connected to a dedicated printer which operates in a normal printing mode. The cordless printer control device is provided as a pair of compact add-on units, a transmitter unit connected to a portable computer and a receiver/switch unit connected to the dedicated printer. The pair of units operate to provide an infrared transmission link by which an alternate/portable computer can detect a break in the normal printing mode and temporarily access the dedicated printer for printing tasks.

In order for the portable computer to gain access to the dedicated printer, the receiver/switch unit is provided with a time-out switch which operates to allow access only if during a predetermined interval, the dedicated printer is not busy with a printing task already assigned to it.

Once the portable computer has gained temporary access, the time-out switch protects its continued use of the dedicated printer without allowing the host computer to regain control until the task is completed. When the time-out switch determines that the printer is not busy during a predetermined interval, this indicates its re-availability to the host computer.

A feature of the invention is its ability to maintain the temporary access mode even during short interruptions of the line-of-sight infrared link between the transmitter and receiver.

Another feature of the invention is the use of standard connectors between computer/printer ports and the control device.

Still another feature of the invention is the use of a serial data communication protocol allowing for combined transmission of data, error correction and control signals.

Other features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding elements or sections thoughout, and in which:

FIGS. 5A–B show a circuit schematic diagram of the transmitter portion of FIG. 2;

FIGS. 6A–B show a circuit schematic diagram of the receiver portion of FIG. 3;

FIGS. 7A–F show a circuit schematic diagram of the switch portion of FIG. 4;

DETAILED DESCRIPTION OF A PREFERRED EMBODIMENT

Figure 1:
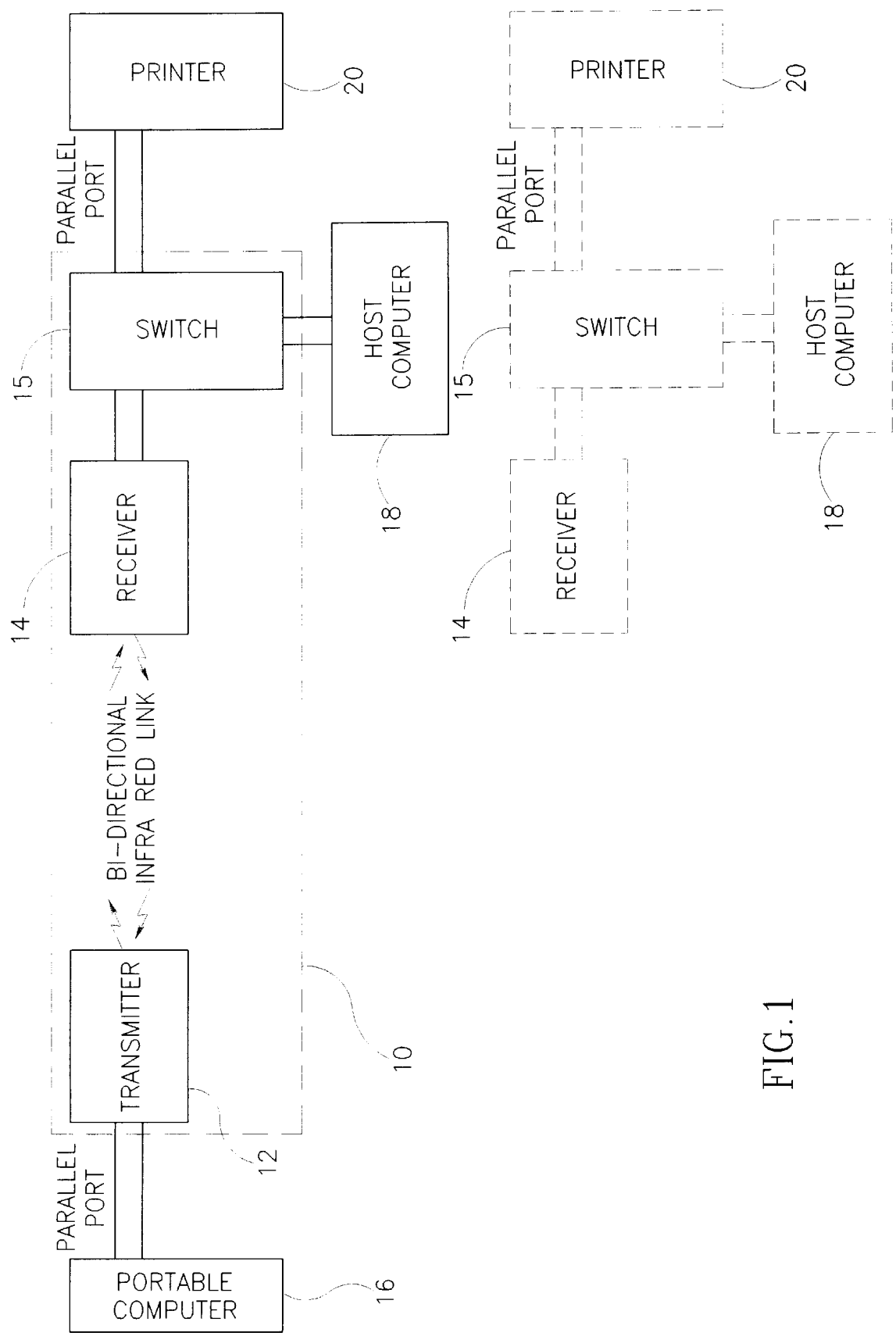
FIG. 1 is an overall schematic diagram of a cordless printer control device constructed and operated in accordance with the principles of the present invention.

Referring now to FIG. 1, there is shown an overall schematic block diagram of a cordless printer control device 10 constructed and operated in accordance with the principles of the present invention. Device 10 comprises a transmitter portion 12, a receiver portion 14, and a switch 15, operating in a computer system comprising a portable computer 16, a host computer 18, and a dedicated printer 20. In the following description, portable computer 16 represents any computer, portable or otherwise, and this terminology is used to distinguish it from host computer 18, which is typically cable-connected to dedicated printer 20.

As will be described further herein, device 10 operates to provide a cordless, bi-directional infrared link between portable computer 16 and printer 20, such that printer 20 will accept control signals and data for printing which is transmitted via the infrared link. Thus, device 10 can interrupt the normal printing mode in which printer 20 operates to print data from host computer 18, and cause it to switch its operational mode to allow for temporary access by portable computer 16. The exchange of data and control signals between portable computer 16 and printer 20 is transparent to both, so that the normal printing mode is interrupted by device 10 in an orderly fashion, and after the printing task is completed, control is then restored to host computer 18.

Figure 2:
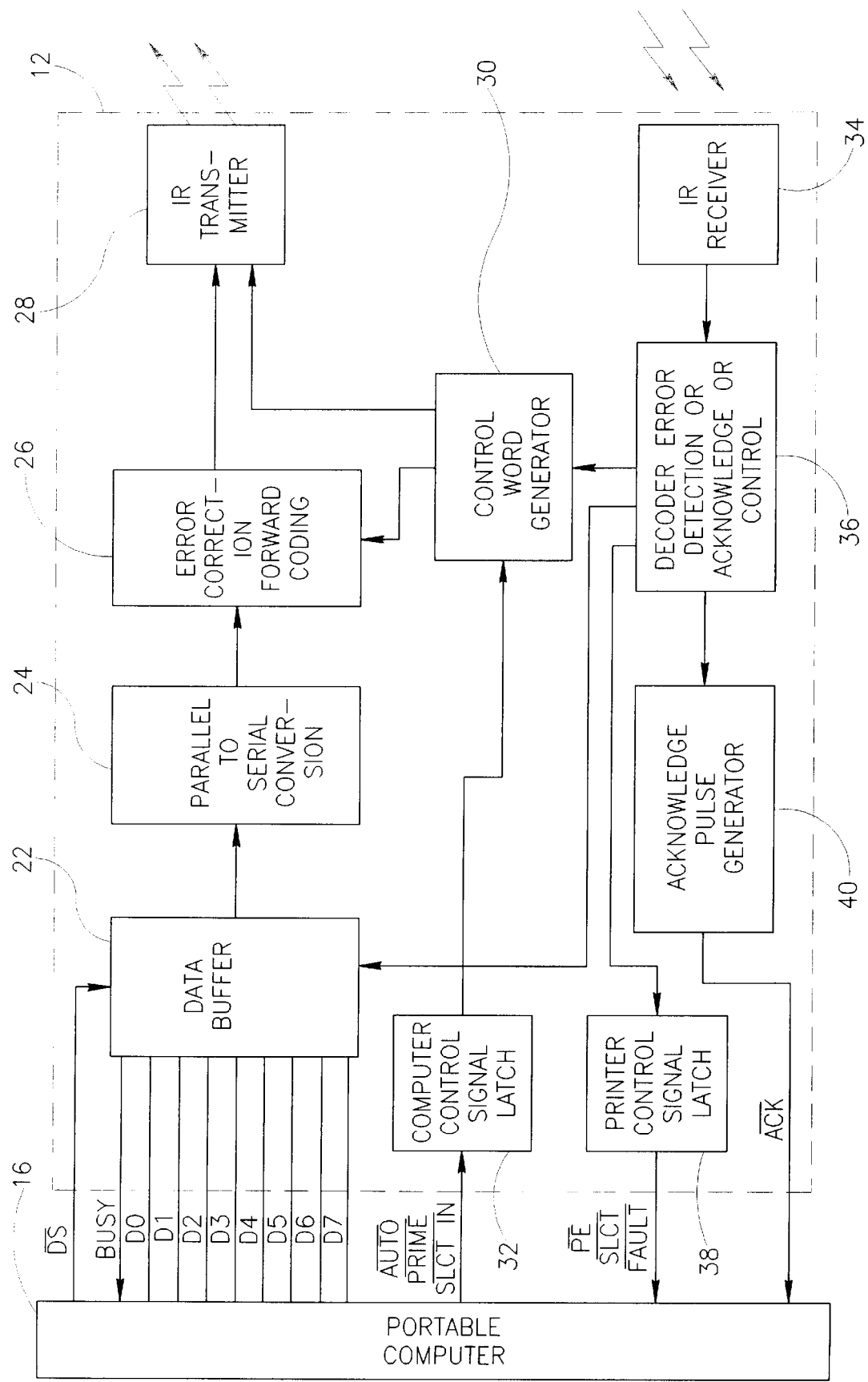
FIG. 2 is schematic block diagram of a transmitter portion of the device of FIG. 1, for transmission of print control signals and data from a portable computer to a receiver portion of the device.

Referring now to FIG. 2, there is shown a schematic block diagram of a transmitter portion 12 of the device of FIG. 1, for transmission of printer control signals (via control words) and data from portable computer 16 to dedicated printer 20. Transmitter portion 12 comprises a data buffer 22 connected to the parallel printer port available in portable computer 16. Data buffer 22 transfers the data in 8-bit format for conversion in a parallel to serial converter 24, and the data is then processed by an error correction coding circuitry 26, which places the data in an error correction format. The formatted data is transferred to an infrared transmitter 28, comprising the transmission end of a cordless IR link for serial data transmission to dedicated printer 20.

As described further herein, infrared transmitter 28 produces IR pulses for transmission of data in serial fashion to receiver portion 14, where it is fed through switch 15 once temporary access to printer 20 is gained, such that the normal printing mode via host computer 20 is suspended.

Transmitter portion 12 also comprises a control word generator 30 for generating control words for transmission via the cordless link to printer 20. A computer control signal latch 32 transfers several control signals, including a Prime signal, which is to initialize printer 20, a Select signal instructing the printer that a control signal is being transferred, or an Auto signal instructing it to automatically add a line feed at every carriage return. Control word generator 30 also receives control signals from printer 20 via IR receiver 34, and these are decoded by decoder 36. Certain control signals are transferred to portable computer 16 via printer control signal latch 38. These signals include PE (paper empty) signal, or a Fault signal, indicating a problem with printer 20.

Decoder 36 also provides a control signal to the acknowledge pulse generator 40, which in turn provides an acknowledge pulse ($\overline{Ack}$) to portable computer 16, completing the handshake protocol between portable computer 16 and printer 20.

The portable computer begins the sequence of operation by providing 8 bits of data output on its parallel port (D0–D7), which is available to data buffer 22. A data strobe signal ($\overline{DS}$) is then provided, which latches the data into data buffer 22, and indicates that printer 20 is to use the data in a printing task. A busy signal is generated by data buffer 22 and transferred to computer 16, indicating the data is now being transferred, and no more data is sent by computer 16 until this signal is released and acknowledge pulse is received.

After the data has been converted into serial format in converter 24 and provided with an error correction format in circuitry 26, the data is transmitted over the IR link, and when receiver portion 14 has received the data and is ready to accept more data, it sends an acknowledge word over the IR link to transmitter portion 12. Upon receipt of the acknowledge word, transmitter portion 12 releases the busy signal and sends an acknowledge pulse to computer 16, indicating it is ready to accept more data. Decoder 36 will determine if the pulse received from printer 20 indicates that the data has been received, and then the acknowledge pulse generator transfers the acknowledge pulse to computer 16, and releases the busy signal.

If receiver portion 14 has not received data, or the data has been distorted, decoder 36 generates a signal which is fed to control word generator 30, advising it of the current status. Control word generator 30 operates to correct the error, by resending the data, with a new control word indicating a resend.

Figure 3:
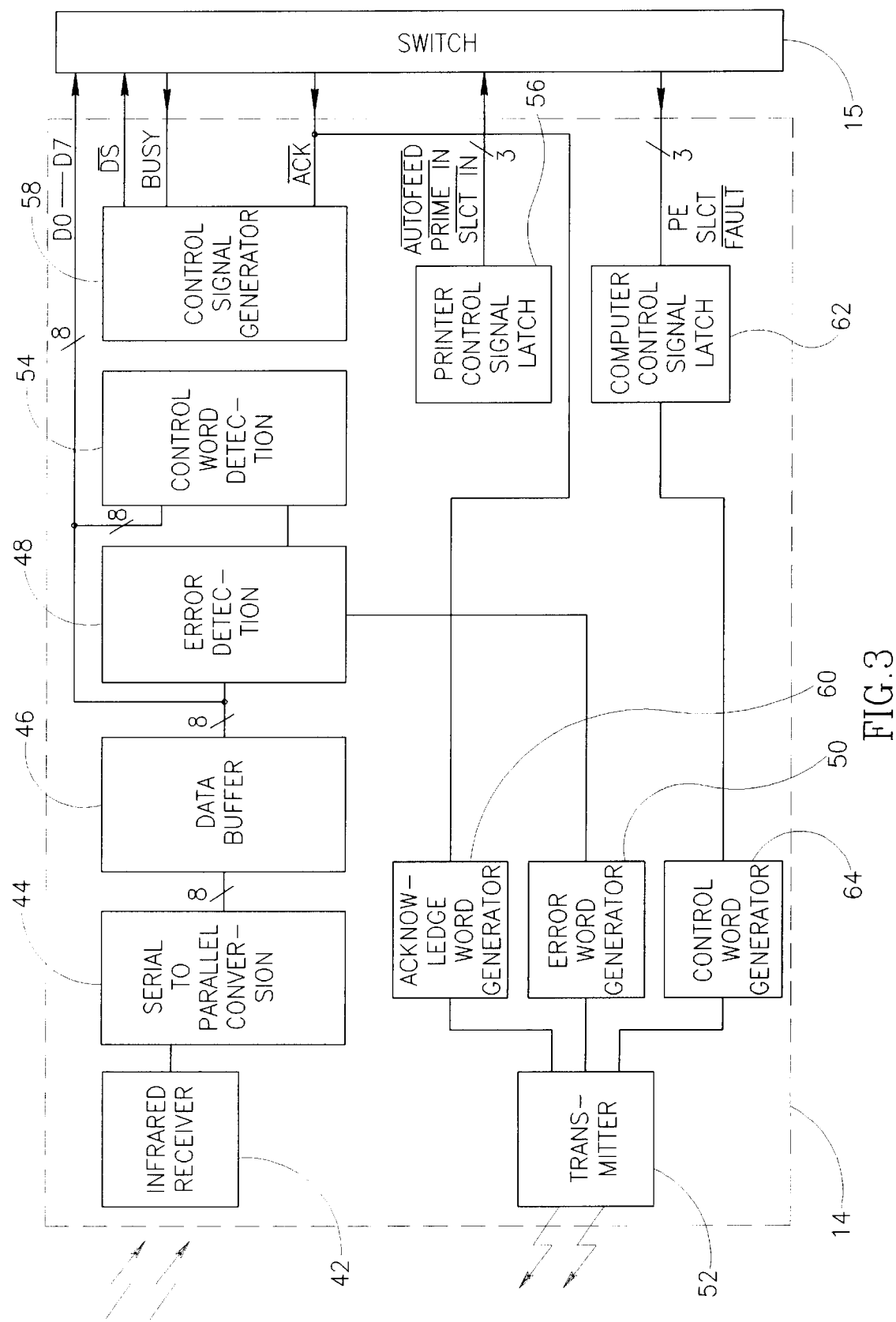
FIG. 3 is a schematic block diagram of the receiver portion of the device of FIG. 1, for controlling a dedicated printer.

Referring now to FIG. 3, there is shown a schematic block diagram of a receiver portion 14 of the device of FIG. 1, for controlling dedicated printer 20. Receiver portion 14 comprises an infrared receiver 42 to receive the infrared pulses containing data and control words from transmitter portion 12, after which the data is transferred for conversion to parallel form by serial to parallel converter 44, and then stored in data buffer 46. The data is then fed to error detection circuitry 48, and if errors are detected, an error word generator 50 operates to provide an IR transmitter 52 with an error word which will be transferred to the transmitter portion 12 and decoded in decoder 36, as described previously.

A control word detection circuit 54 determines if a control word or data for printing has been received. The information protocol contains a 9th bit for differentiating between data and control, and if a control word is transferred, a printer control signal latch 56 changes the status of printer 20, using the Auto, Prime or Select signals, described above. Using this method, control words, error correction words and data are sent in concert over the serial IR link.

If data for printing has been received, control signal generator 58 sends a data strobe signal and printer 20 answers with a busy signal, indicating printer 20 is busy printing the data. When printer 20 has finished printing the data, the busy signal is released and an acknowledge pulse is fed by printer 20, and transferred to acknowledge word generator 60, for transfer via IR transmitter 52 back to transmitter portion 12. Once the data strobe signal is given, the data can be transferred directly to printer 20. If there is a change in the status of printer 20, control signals such as PE, Select or Fault are provided to computer control signal latch 62, and via control word generator 64, for transfer via IR transmitter 52 to transmitter portion 12, to notify computer 16.

As described earlier, in the normal mode of printer 20 operation, data from host computer 18 is printed by printer 20. In accordance with the principles of the present invention, the operational mode of printer 20 can be altered to allow for temporary access by portable computer 16 for printing tasks. This is achieved by operation of switch 15 which enables printer 20 to be shared by host computer 18 and portable computer 16.

Figure 4:
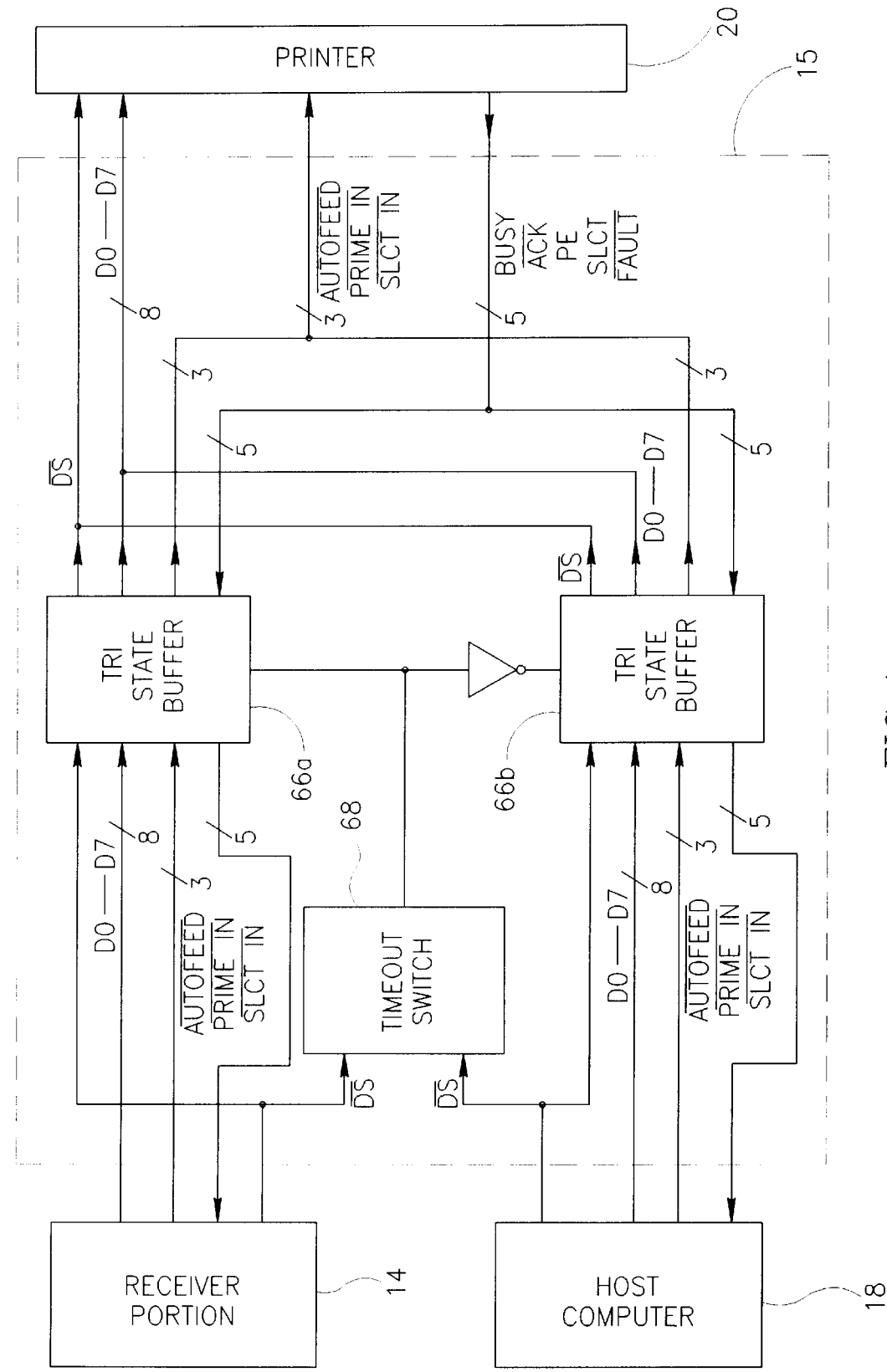
FIG. 4 is a schematic block diagram of a switch portion of the device of FIG. 1, for determining a printing mode.

Referring now to FIG. 4, there is shown a schematic block diagram of a switch portion 15 of the device 10 of FIG. 1, for determining a printing mode. Switch 15 comprises a tri-state buffer 66a,b which transfers all the control signals and data exchanged between printer 20 and each of portable computer 16 and host computer 18.

Tri-state buffer 66a,b is a standard type of buffer used to allow two different signals to share the same wire. Thus, a parallel signal path exists through tri-state buffer 66a,b for each of the data signals D0–D7 and the data strobe signal, as well as the printer control signals. A timeout switch 68 is provided in the signal path for the data strobe signal, and switch 15 determines whether portable computer 16 or host computer 18 has gained control of printer 20.

If host computer 18 is active in the normal printing mode, its data strobe signal will pulse continually. If no pause is detected in this signal for over 5 seconds, timeout switch 68 will not allow portable computer 16 access, by blocking its data strobe signal path from receiver portion 14 through tri-state buffer 66a. If however, host computer 18 is silent and not active, receiver portion 14 of device 10 can gain temporary access to printer 20, when tri-state buffer 66b blocks the data strobe signal path of host computer 18. Time out switch 68 can be adjusted for a range of time periods, to vary the "silent" period enabling access to printer 20 by the other computer.

The operation of timeout switch 68 is useful to avoid unintended "grabbing" of access to printer 20 by one of the computers. For example, if portable computer 16 is sending data and the IR link is blocked by an individual passing between transmitter portion 12 and receiver portion 14, the short duration of the computer "silent" period is not interpreted as allowing access by the host computer 18.

If the IR link is blocked, the data transmission is completely interrupted, and once restored, the error detection circuitry will be needed to insure that printer 20 does not print mistakes at the beginning and end of the interruption. An error correction detection protocol is used in which the data has a control word associated with it. If the data is not received properly, an error word will be sent indicating this, and the data will be resent. If no acknowledge pulse is sent, the assumption is that the data is lost, and it is resent after a programmable delay.

In FIGS. 5A–B, there is shown a circuit schematic diagram of transmitter portion 12 of FIG. 2, which can be implemented in an Intel 87C51 or equivalent microcontroller 70 in accordance with skill of the art electronic design techniques. The data is provided by signals D0 through D7 via a cable connector 71 from computer 16, which is the input to microcontroller 70 ports P1.0–P1.7. The data strobe signal is provided to port P3.2 as an interrupt, indicating to microcontroller 70 that data is available for transfer. Simultaneously, the data strobe signal is fed to the input of J-K flip-flop 72 (type HC-109), which answers the data strobe signal by providing an output busy signal within 1 microsecond. Flip-flop 72 is employed separately for this, since it responds faster than microcontroller 70, to indicate to portable computer 16 that the data strobe signal has been received and data transfer is underway.

Microcontroller 70 responds to the data strobe signal by reading the data and converting it to serial format, and generates the control word and the serial data word. These are sent out serially via the UART of microcontroller 70 which is listed as the serial data output line 74. Microcontroller 70 then waits for an acknowledge word to be returned on the serial input line 76, from the acknowledge word generator 60 in receiver 14 (FIG. 3).

By operating microcontroller 70 at 12 MHz, a transmission baud rate of 375K can be achieved. Greater speeds are available by increasing the clock rate of microcontroller 70.

Also provided by microcontroller 70 are the Error, Select, PE, and acknowledge pulse signals, which are sent to portable computer 16 as control signals. The status of these signals is provided by a control word sent from receiver portion 14. The acknowledge pulse generated in microcontroller 70 is accompanied by busy set and reset signals, respectively, from ports P0.0 and port P0.1. The busy reset removes the busy signal on the next clock pulse on flip-flop 72. The acknowledge pulse from port P0.2 is sent to computer 16 to complete the handshake protocol. Port P0.6 drives an LED indicating that the device 10 is operating. Ports P2.0 and P2.1 are used for input of Auto and Select printer control signals.

Microcontroller 70 port P3.3 is the input for an interrupt signal used to initialize printer 20, and reset it. In response to this signal, microcontroller 70 generates a control word in control word generator 30, to provide an initialization routine, and send it out on the IR link, while waiting for the acknowledge word to be returned.

In FIGS. 6A–B, there is shown a circuit schematic diagram of receiver portion 14 of FIG. 3, also implemented in an 87C51 microcontroller 80. Once the data is received via the IR receiver 42 (FIG. 3) and inputted to microcontroller 80 on port P3.0, a serial to parallel conversion of the data is performed in microcontroller 80. The data is then sent for error detection decoding, and if an error is found, error word generator 50 operates to send a signal via the UART on port P3.1. If a control word was received containing control signal information, these control signals are provided on the printer control signal latch 56, such as ports P1.0, P1.1, and P1.2, and are sent via non-inverting buffers to switch 15.

Otherwise, if printing data was received, then it is provided on ports P0.0–P0.7, and the data strobe signal is provided on port P1.0. A busy signal is then generated by printer 20 and is fed to microcontroller 80 on port P2.0. When printer 20 completes printing the data, the busy signal is released and an acknowledge pulse is sent, which is received as an interrupt on port P3.2. When this interrupt is received, the acknowledge word generator 60 transfers the acknowledge word via the IR link back to the transmitter portion 12.

FIGS. 7A–F show a circuit schematic diagram of the switch portion 15 of FIG. 4. Data from portable computer 16 is transferred via the transmitter portion 12 and IR link, and is then transmitted to receiver portion 14, which is connected to switch portion 15 a T-connected via cable connector J2 (portion 51). Host computer 18 is connected to switch 15 via cable connector J3, and switch 15 is connected to printer 20 via cable connector J1. When a data strobe signal is fed through connector J2 from portable computer 16 to a one-shot device IC7A a timeout function is generated which indicates that host computer 18 may not access printer 20, since portable computer 16 has gained temporary access. The one-shot device IC7A is programmable to generate a 5 second disable signal which prevents transfer of data via connector J3, so that only control signals passing via IC1, IC2 and IC3 are transferred between portable computer 16 and printer 20.

While portable computer 16 has gained temporary access to printer 20, and a data strobe signal continues to appear, for at least 5 more seconds host computer 18 will see a busy signal 82 and a de-selected mode signal 84, which are transferred via IC3, indicating to host computer 18 that printer 20 is off-line.

If the timeout period is exceeded, the normal printing mode may be restored such that host computer 18 communicates with printer 20, and control signals will be passed between them via connector J3 and IC4, IC5 and IC6. In this mode, portable computer 16 will see a busy signal 86 and a de-selected mode signal 88, indicating to portable computer 16 that printer 20 is off-line.

Figure 8:
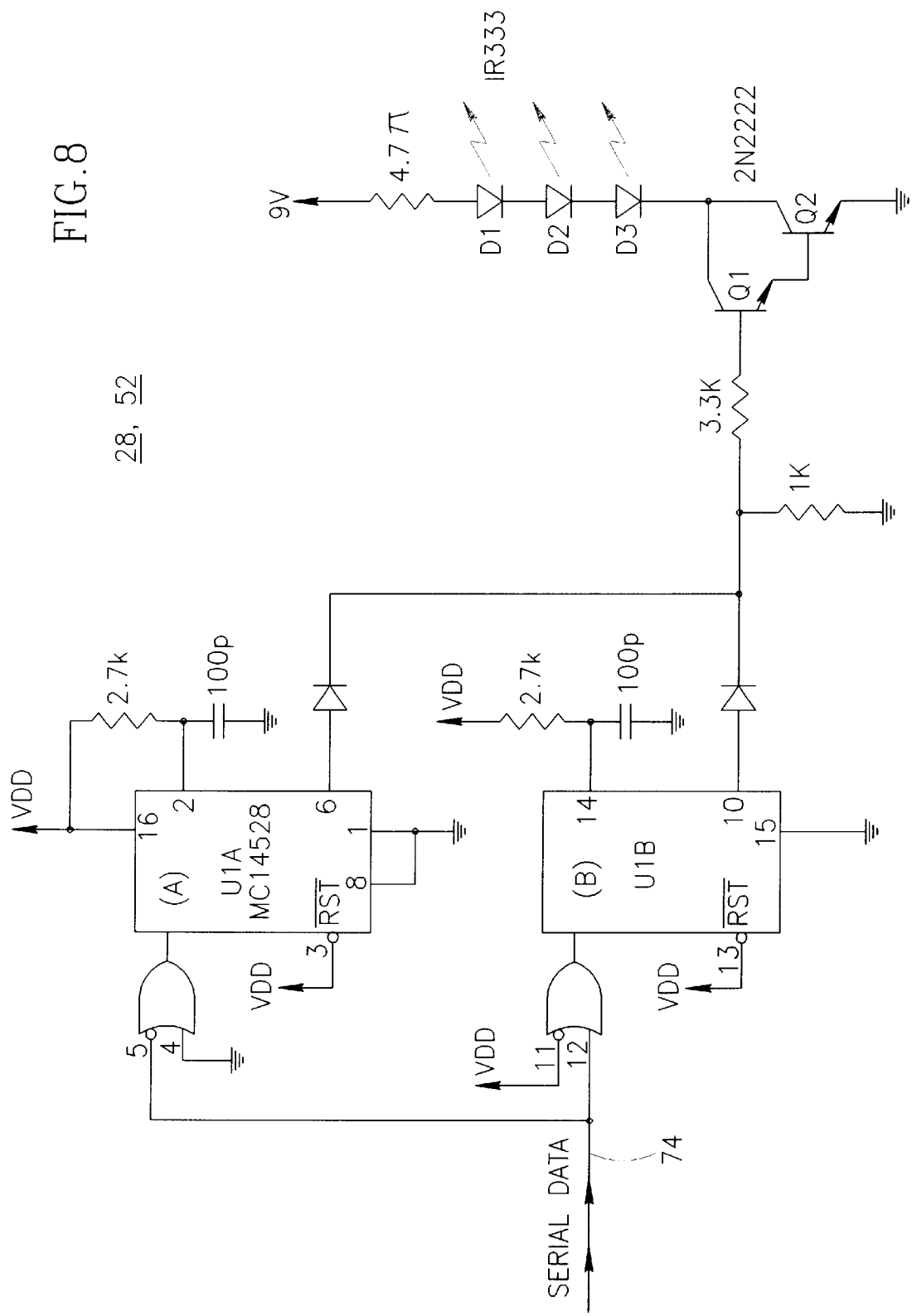
FIG. 8 is a circuit schematic diagram of an infrared (IR) transmitter used in the transmitter and receiver portions of the device.

FIG. 8 is a circuit schematic diagram of infrared (IR) transmitters 28, 52 used in the transmitter 12 and receiver 14 portions of device 10. IR transmitters 28, 52 each comprise a one-shot device having two sections V1A and V1B, wired in reverse such that each is sensitive to an opposite pulse edge polarity. Th outputs of V1A and V1B are connected in wired OR fashion, and fed to a pair of transistors Q1 and Q2 wired in a Darlington arrangement. Transistors Q1 and Q2 drive three infrared LED diodes, D1–D3.

In operation, serial data 74 being sent from microcontroller 70, for example, is fed into one shot-device V1A and V1B, and on a negative going edge one-shot V1A is fired, and on a positive going edge one-shot V1B is fired. The output of V1A and V1B triggers transistors Q1, Q2, and LEDs D1–D3 will then generate the burst of infrared light. In this fashion, both a positive going transition or a negative going transition of the serial data generates an outgoing pulse from IR transmitter 28.

Figure 9:
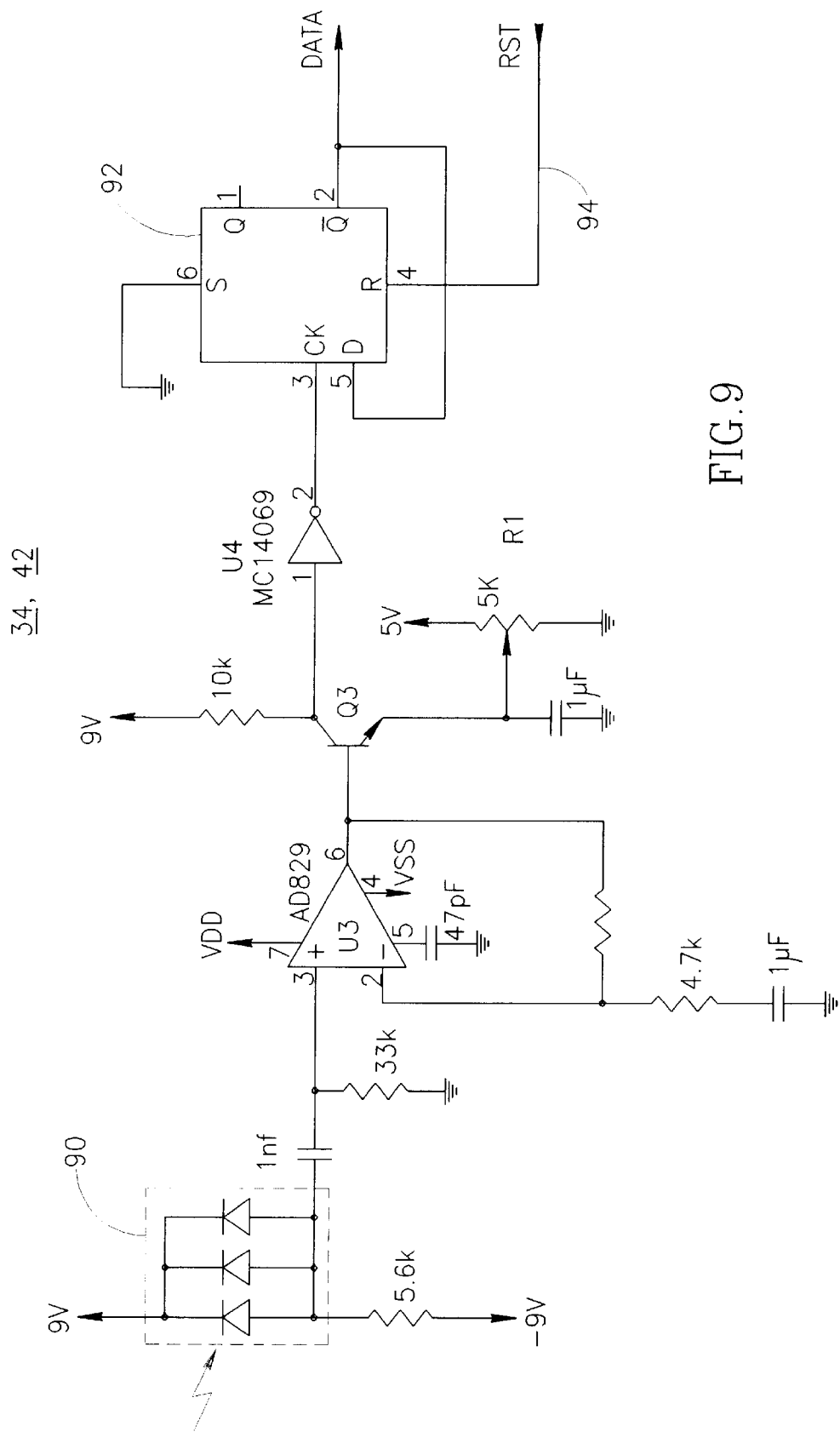
FIG. 9 is a circuit schematic diagram of an infrared (IR) receiver used in the transmitter and receiver portions of the device.

FIG. 9 is a circuit schematic diagram of infrared (IR) receivers 34, 42 used in transmitter 12 and receiver 14 portions of device 10. IR receivers 34, 42 each comprise three infrared detectors 90 wired in parallel, which feed an operational amplifier U3. The output of U3 drives a transistor Q3 and inverter U4 pair, with a 5K ohm potentiometer R1 allowing adjustment of the threshold level to reject noise. Inverter U4 feeds its output to a flip-flop 92, which is a simple latch set in a toggle mode.

In operation, IR detectors 90 receive the infrared pulse and transfer the information received to amplifier U3, which drives transistor Q3, and the output of inverter U4 operates flip-flop 92. Flip-flop 92 responds to every pulse as either a positive going or negative going edge, so every time it receives a pulse, it clocks the latch to change the status from either high (1) to low (0), or from a low back to a high state. In this fashion, the original transition of high to low is reassembled at the receiver portion 14.

The latch provided by flip-flop 92 is initialized in accordance with the data protocol which considers a high state as no data, and a start bit as a low state. Transmitter portion 12 and receiver portion 14 and their respective microcontrollers 70, 80 follow the same protocol, such that during initialization with no data, both latches start in a high state.

Thus, with both latches in a high state, the first pulse received causes flip-flop 92 to drop to a low state, which is the start bit. The reset signal 94 is provided by microcontrollers 70, 80 to reset flip-flop 92 either if an error condition is detected or whenever IR transmitters 28, 52 are active so that no data transmitted is received and returned. Thus, using the reset function, IR transmitters 28, 52 can be shut-off immediately during transmission.

It will be appreciated by those skilled in the art that the IR link may be replaced by a communication link using low power RF, with appropriate modifications. In addition, where there are several dedicated printers 20 within range of the IR link, each may be distinctly identified in the data communication protocol by use of an identification code in the control words, so that only the desired printer 20 responds.

Figure 10:
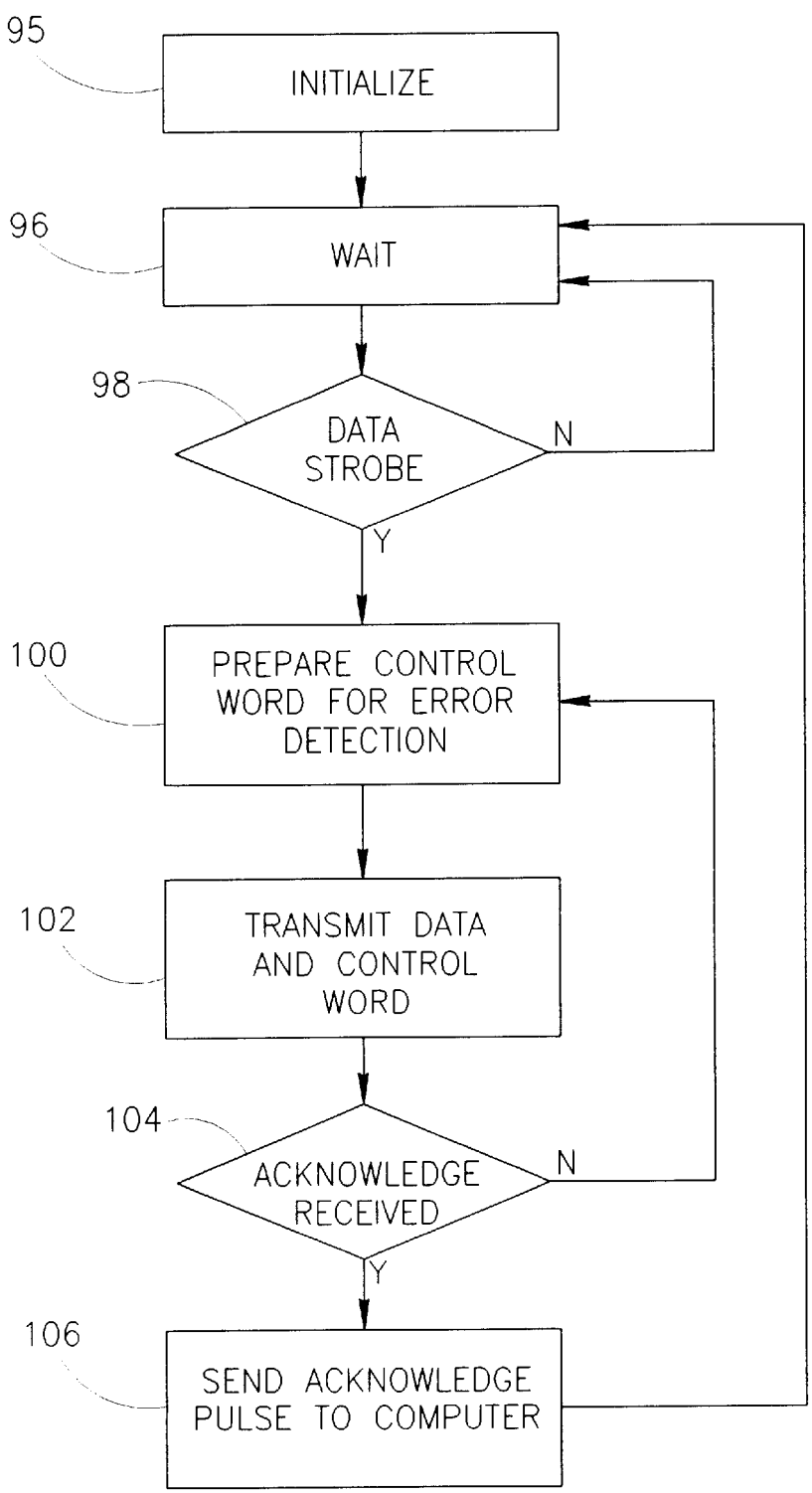
FIGS. 10–11 are flowchart diagrams of the operational sequence of the cordless printer control device of FIG. 1.
Figure 11:
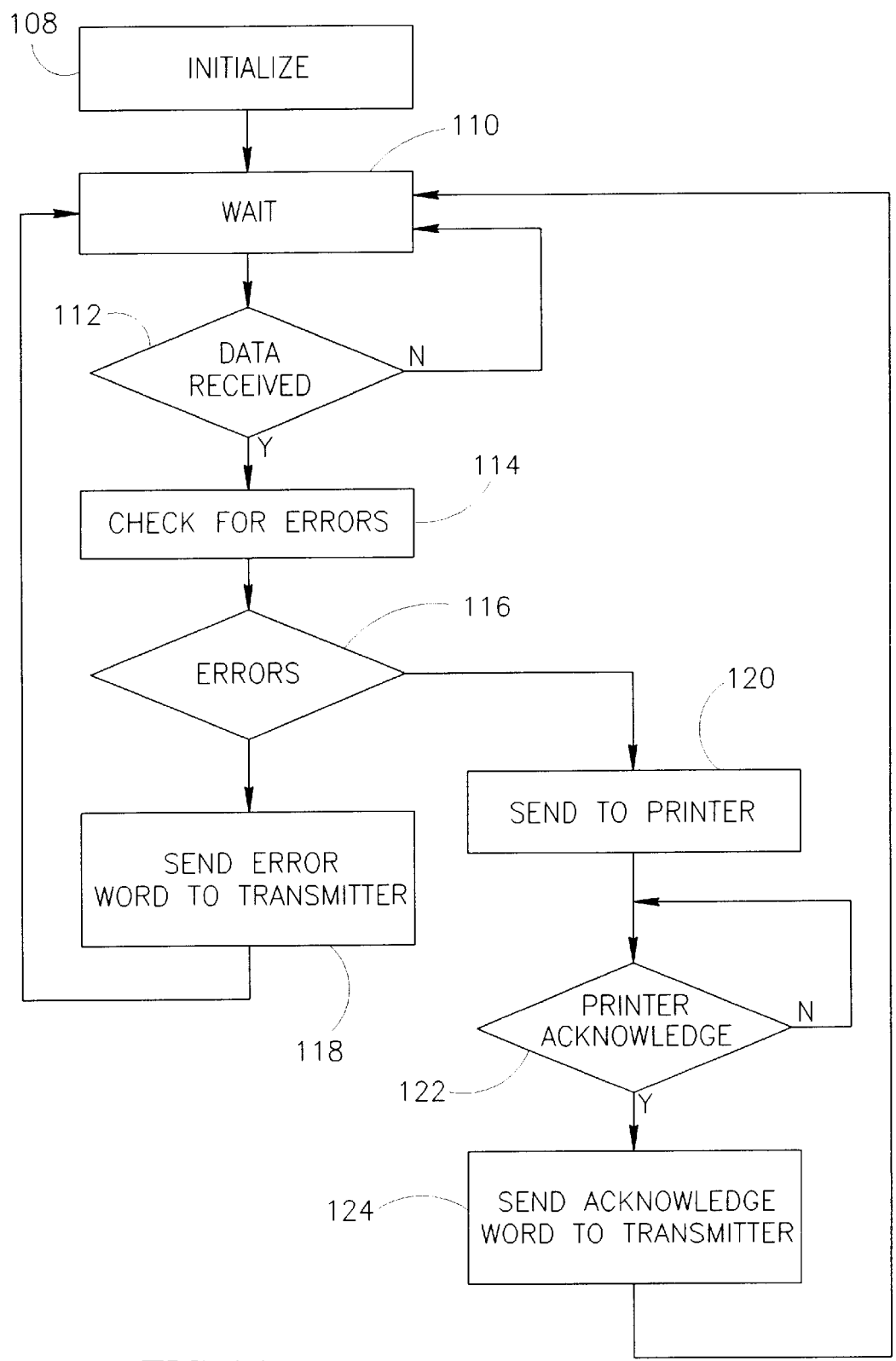

FIGS. 10–11 are flowchart diagrams of the operational sequence of the cordless printer control device 10 of FIG. 1. The flow charts of FIGS. 10–11 can be converted to assembler language for use in microcontrollers 70, 80, in accordance with skill of the art software programming techniques.

In FIG. 10, the operational sequence of transmitter portion 12 is shown, which begins in block 95 where microcontroller 70 is initialized so that it can handle the appropriate signals. In block 96, a wait state is entered while waiting for a data strobe from portable computer 16 advising that there is data to be sent to printer 20. Upon receipt of the data strobe signal in block 98, in block 100 a control word is prepared to accompany the data for error detection.

In block 102, the data and the control word are transmitted together to receiver portion 14 where an error check is made. The operational sequence then waits in block 104 for an acknowledge pulse from printer 20, and upon receipt of an acknowledge, an acknowledge word is sent to transmitter portion 12, which then transfers an acknowledge pulse to portable computer 16. If an acknowledge word is not received, the operation returns to block 100 where the control word for error detection is generated again, and the data is resent, until a good acknowledge word is received from receiver portion 14 and printer 20. Upon receipt of a good acknowledge word, in block 106 this is sent to computer 16 and the operation returns to the wait state in block 96.

In FIG. 11, the operational sequence of receiver portion 14 is shown, beginning in block 108 with initialization of microcontroller 80. The operation proceeds to block 110 where a wait state is entered, awaiting receipt of serial data which is either a control word or the data from transmitter portion 12. Upon receipt of data in block 112, it is checked for errors in block 114. If errors are detected in block 116, in block 118 an error word will be sent back to transmitter portion 12 and operation will return to the wait state in block 110.

If there are no errors in the serial data received, this means it is data to be sent to printer 20. In block 120 the data is sent to printer 20 and in block 122, a wait state is entered, awaiting receipt of an acknowledge pulse from printer 20. Upon receipt of a printer acknowledge pulse in block 122, a serial acknowledge word is sent to transmitter portion 12 in block 124, and operation returns to the wait state in block 110.

Having described the invention with regard to certain specific embodiments thereof, it is to be understood that the description is not meant as a limitation, since further modifications may now suggest themselves to those skilled in the art, and it is intended to cover such modifications as fall within the scope of the appended claims.

We claim:

1. A cordless printer control device for controlling a printer dedicated by a hard-wired link to a host computer, to enable shared, cordless printing on the dedicated printer in accordance with printing tasks directed by an alternate computer not linked to the dedicated printer by a hard-wire, said device comprising:

means for generating a set of printer data and control information signals in accordance with data available at a printer output port of the alternate computer;

means for transmitting said printer data and said control information signals via a cordless link;

means for receiving said transmitted printer data and said control information signals over said cordless link; and switching means being connected to the hard-wired link between the dedicated printer and the host computer, and being connected by a T-connection to said cordless link via said receiving means, said switching means being operable in one of normal and temporary shared access modes to control the dedicated printer respectively, via the host computer through the hard-wired link in said normal mode, and via the alternate computer through said T-connected cordless link in said temporary shared access mode, in accordance with said printer data and said control information signals, without requiring cabling changes in the hard-wired link, wherein said switching means comprises a timer defining a predetermined interval beyond which inactivity of the host computer enables the alternate computer to control the dedicated printer in said temporary shared access mode, and said timer defines a predetermined period beyond which inactivity of the alternate computer enables the host computer to regain control of the dedicated printer from said temporary shared access mode, said predetermined period exceeding a time period associated with an unintended interruption in transmission of said printer data.

2. The device of claim 1 wherein said cordless link is a bi-directional infrared communication link.

3. The device of claim 1 wherein said cordless link is a low power RF communication link.

4. The device of claim 1 wherein said means for generating and means for transmitting said printer data and said control information signals is connected to said printer output port of the alternate computer via a standard connector used for connection to a printer.

5. The device of claim 4 wherein said standard connector is adapted for connection to a parallel printer port.

6. The device of claim 1 wherein said switching means is connected to said dedicated printer via a standard input printer port of said dedicated printer, and is connected to said host computer via a standard connector of said host computer used for connection to a printer.

7. The device of claim 1 wherein said means for generating said printer data and said control information signals includes means for generating an error correction format for transmission of said printer data.

8. The device of claim 1 wherein said means for generating said printer data and said control information signals comprises a serial data communication protocol allowing for transmission of data words, error correction words and control signal words in concert with appropriate acknowledge words to verify reception.

9. The device of claim 1 for controlling selected ones of a plurality of dedicated printers, wherein said means for generating said printer data and said control information signals provides an identification code for controlling in accordance therewith a selected one of said plurality of dedicated printers.

10. A method of controlling a printer dedicated by hard-wired link to a host computer, to enable shared, cordless printing on the dedicated printer in accordance with printing tasks directed by an alternate computer not linked to the dedicated printer by a hard-wire, said method comprising the steps of:

generating a set of printer data and control information signals in accordance with data available at a printer output port of the alternate computer;

transmitting said printer data and said control information signals via a T-connected cordless link;

receiving said transmitted printer data and said control information signals over said T-connected cordless link; and switching between one of normal and temporary shared access modes to control the dedicated printer respectively, via the host computer through the hard-wired link in said normal mode, and via the alternate computer through said T-connected cordless link in said temporary shared access mode, in accordance with said printer data and said control information signals, without requiring cabling changes in the hard-wired link, wherein as part of said switching step, a predetermined interval is defined beyond which inactivity of the host computer enables the alternate computer to control the dedicated printer in said temporary shared access mode, and a predetermined period is defined beyond which inactivity of the alternate computer enables the host computer to regain control of the dedicated printer from said temporary shared access mode, said predetermined period exceeding a time period associated with an unintended interruption in transmission of said printer data.

11. The method of claim 10 wherein said transmitting step is performed via a bi-directional infrared communication link.

12. The method of claim 10 wherein said transmitting step is performed via a low power RF communication link.

13. The method of claim 10 wherein said generating step comprises providing a serial data communication protocol allowing for transmission of data words, error correction words and control signal words in concert with appropriate acknowledge words to verify reception.

14. The method of claim 10 for controlling selected ones of a plurality of dedicated printers, wherein said generating step provides an identification code for controlling in accordance therewith a selected one of said plurality of dedicated printers.

* * * * *